(12) United States Patent
Ball et al.

(10) Patent No.: US 6,264,172 B1
(45) Date of Patent: Jul. 24, 2001

(54) ELECTRIC FENCE

(75) Inventors: Allan James Ball, Mississauga; James Richard Aiken, Etobicoke, both of (CA)

(73) Assignee: Ontario Hydro, Toronto (CA)

( * ) Notice: Subject to any disclaimer, the term of this patent is extended or adjusted under 35 U.S.C. 154(b) by 0 days.

(21) Appl. No.: 09/138,364

(22) Filed: Aug. 21, 1998

(30) Foreign Application Priority Data

Aug. 22, 1997 (CA) ................................................ 2213752

(51) Int. Cl.[7] ................................................ A01K 3/00
(52) U.S. Cl. ................................ 256/10; 256/31; 256/25
(58) Field of Search .................................. 256/10, 1, 24, 256/25, 31, 35

(56) References Cited

U.S. PATENT DOCUMENTS

| | | | |
|---|---|---|---|
| 517,423 | * 4/1894 | Bennett et al. | 256/35 |
| 2,163,954 | * 6/1939 | Lucas | 256/10 |
| 2,626,304 | * 1/1953 | Telecky et al. | 256/10 |
| 4,685,656 | * 8/1987 | Lee et al. | 256/13.1 |

FOREIGN PATENT DOCUMENTS

| | | | |
|---|---|---|---|
| 114066 | * 3/1942 | (AU) | 256/10 |
| 2 592 512 | 12/1985 | (FR) . | |
| 2592512 | * 12/1985 | (FR) | 256/10 |

* cited by examiner

Primary Examiner—Lynne H. Browne
Assistant Examiner—John R. Cottingham
(74) Attorney, Agent, or Firm—Pennie & Edmonds LLP

(57) ABSTRACT

An electric fence is disclosed for keeping selected small animals out of an enclosed area. The electric fence has an electrically conductive screen, a plurality of support members for supporting the screen, at least one electrically conductive element positioned adjacent to the screen on a side of the screen opposite the enclosed area, the electrically conductive element mounted to the fence by a plurality of mounting elements, the electrically conductive element being operably couplable to an electric charge generator, and the screen being electrically grounded. The electric fence may be mounted adjacent to a perimeter fence by a distance greater than the distance the selected animal can jump.

22 Claims, 4 Drawing Sheets

ELECTRIC FENCE

FIELD OF THE INVENTION

The present invention relates to electrified fences for keeping squirrels, rabbits, and other ground dwelling animals out of enclosed areas.

BACKGROUND OF THE INVENTION

Certain facilities, such as transformer substations, pose a potential hazard to both the public and wildlife. Occasionally, wild animals, such as squirrels or raccoons, may enter a transformer substation and short circuit a power line causing an outage. Chain link fences have been used to isolate the public, and to some extent, wildlife from distribution stations. Traditional chain link fences usually consist of a wire chain link screen or screen suspended between a plurality of suspension posts. Since the chain link screens are heavy and must be tensioned to maintain their structure, the supporting posts must be anchored to the ground, often by concrete backfills. Chain link fences have not proven effective in preventing the entry of squirrels and other small animals from transformer substations. Essentially small animals, particularly squirrels, are able to climb over chain link fences.

Occasionally, electrified fences have been used to keep certain animals, usually vermin, out of hazardous areas. These electric fences generally consist of a bare electrically conductive element, such as a wire or a metal bar, suspended on poles. The electric element is electrically coupled to a charging device. Occasionally, an electrified fence may have more than one conductive wire strung between the poles. To keep the electrified elements taut, tension must be applied; thus requiring the supporting poles to be anchored to the ground. The costs associated with building electrified fences with anchored support poles is relatively high since the anchoring of supporting posts is labour intensive.

Electrified fences have proven to be effective in keeping out larger animals, such as dogs or wolves, from enclosed areas; however, smaller animals such as squirrels, are often small enough to avoid the electrically charged wires of electric fences. Occasionally, these small animals are quick enough to pass through the wires between shock pulses (from the fence energizer) without receiving a shock. At other times, these small animals avoid the electrified elements of the fence by burrowing under the fence. As a result, the use of electrified fences has thus far not been effective in deterring squirrels and other small animals from entering certain enclosed locations such as transformer stations and distribution stations. There is a need for an effective and low cost fence which effectively prevents small animals, particularly squirrels, from entering enclosed areas such as electrical distribution stations.

SUMMARY OF THE INVENTION

The present invention is a system for keeping selected small animals out of an enclosed area, the system having a perimeter fence and an internal electric fence having an electrically conducting element. The internal electric fence is mounted parallel to the perimeter fence at a distance greater than the distance the selected animals are capable of jumping.

The present invention is also directed at an electric fence for keeping selected animals out of an enclosed area. The electric fence is made from an electrically conductive grounded screen supported by a plurality of support members. The screen is dimensioned to prevent the selected animal from penetrating the screen. At least one electrically conductive element is mounted to the electric fence adjacent to the screen and opposite to the enclosed area.

The present invention is also directed at an electric fence for keeping selected small animals out of an enclosed area, the fence having a grounded electrically conductive screen supported by a plurality of support elements. A portion of the screen is angled away from the enclosed area such that the selected animal will hang from the screen while attempting to climb over the screen. An electrically conductive element is mounted to the electric fence opposite the enclosed area and adjacent to the portion of the screen.

BRIEF DESCRIPTION OF THE FIGURES

Further features and advantages of the method and device embodying the present invention will now be described and made clearer from the ensuing description, reference being made to the accompanying drawings, in which.

DETAILED DESCRIPTION OF THE INVENTION

Figure 1:
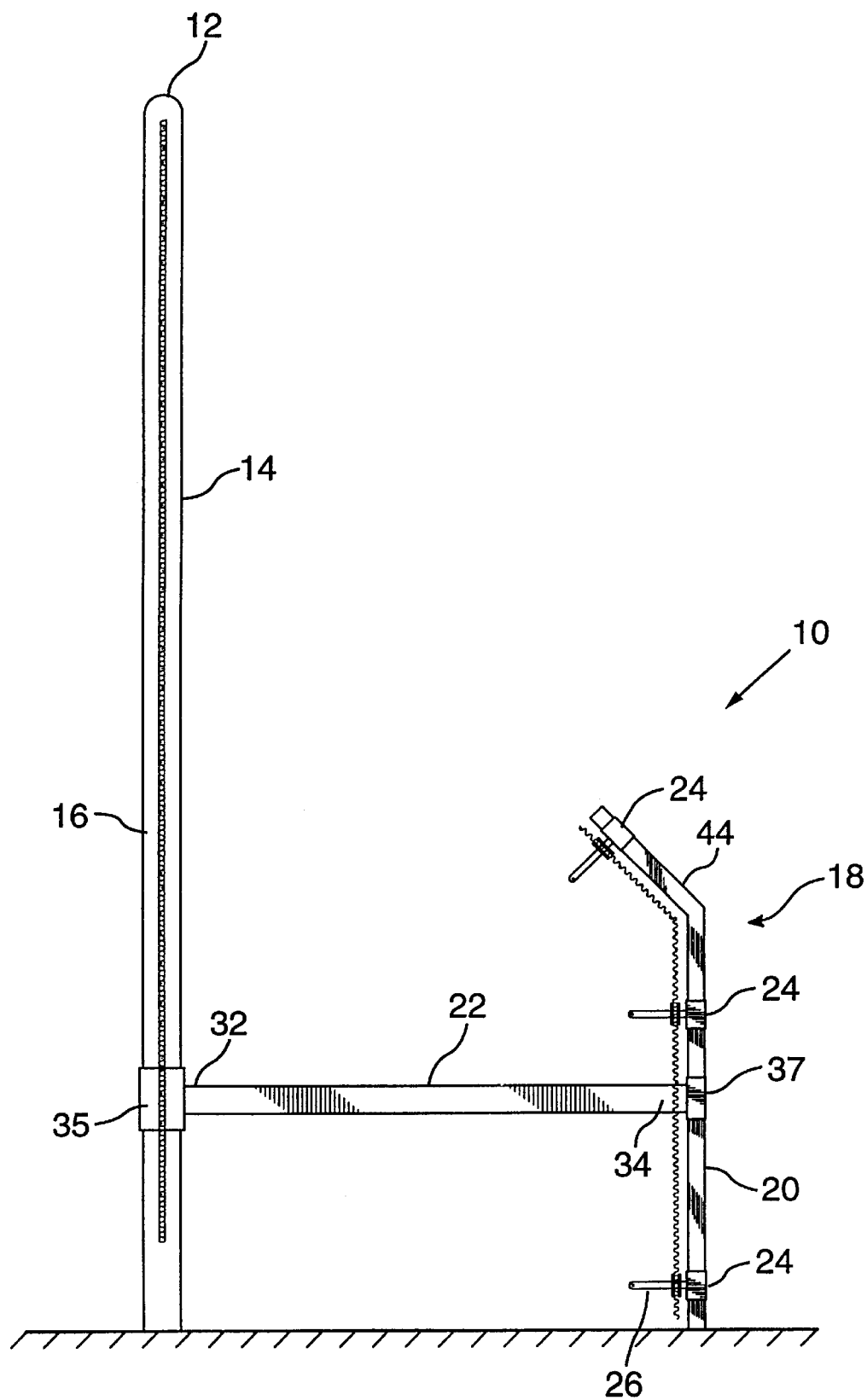
FIG. 1 is a side view of the present invention.
Figure 2:
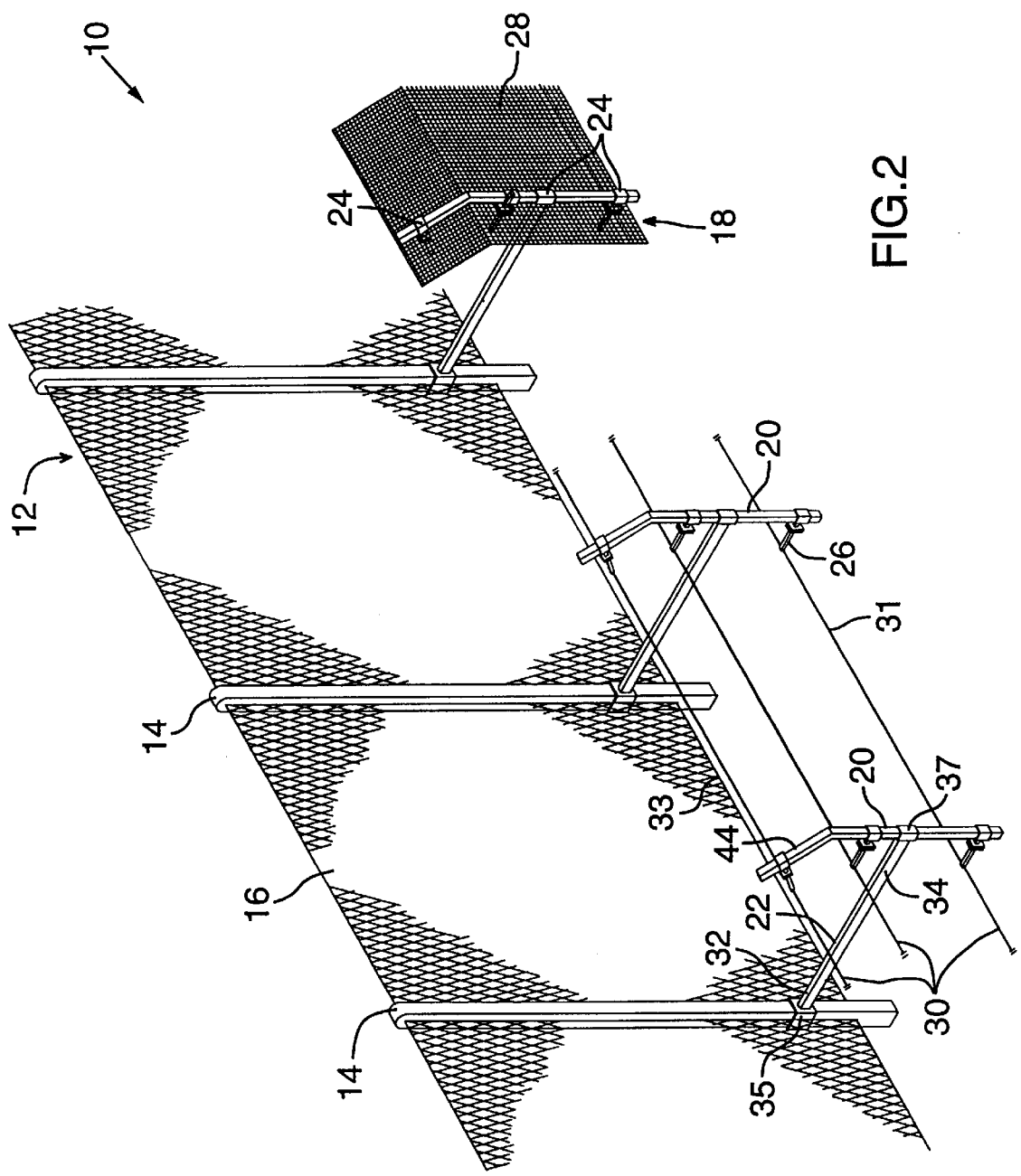
FIG. 2 is a perspective view of the present invention.

Referring firstly to FIGS. 1 and 2, the electric fence constructed according to the present invention, shown generally as 10, comprises a fence 12 mounted to an electrified fence 18. Fence 12 may comprise a chain link fence 12 having wire screen 16 supported between poles 14. Poles 14 are anchored to ground by either concrete or some other anchoring system. Electrified fence 18 comprises support elements 20, electrified wires 30 and screen 28. Support elements 20 are preferably poles. Electrified fence 18 is mounted to chain link fence 12 by mounting arms 22. Mounting arms 22 each have first end 32 adapted to securely and rigidly mount to poles 14, and a second end 34 adapted to securely and rigidly mount to poles (support elements) 20. Mounting arms 22 may be formed from a variety of materials such as metal or plastic tubes. First end 32 may be mounted to pole 14 by bracket 35, and end 34 may be mounted to poles 20 by bracket 37. To prevent small animals from jumping from fence 12 over fence 18, the distance between fence 12 and 18 is chosen carefully. Certain small animals, such as raccoons, are not capable of jumping long distances, while other animals, such as squirrels, have been known to jump as far as five feet. Therefore, if fence 18 is more than five feet from fence 12, squirrels, or other small animals, jumping from fence 12 will land short of fence 18. To maintain this selected distance between fences 12 and 18, mounting arms 22 are at least 5 feet long.

Poles 20 are securely mounted to fence 12 by mounting arms 22, thereby eliminating the need to anchor poles 20 to the ground. This feature reduces the time necessary to construct electric fence 18 and eliminates the risk of cutting buried power lines, communications cables, or pipes. Preferably, poles 20 are made of an electrically insulating material such as plastic or wood. Ideally, poles 20 comprise elongated plastic "T-beams". Alternatively, poles 20 may comprise metal pipes, metal beams or even wooden poles.

Figure 5:
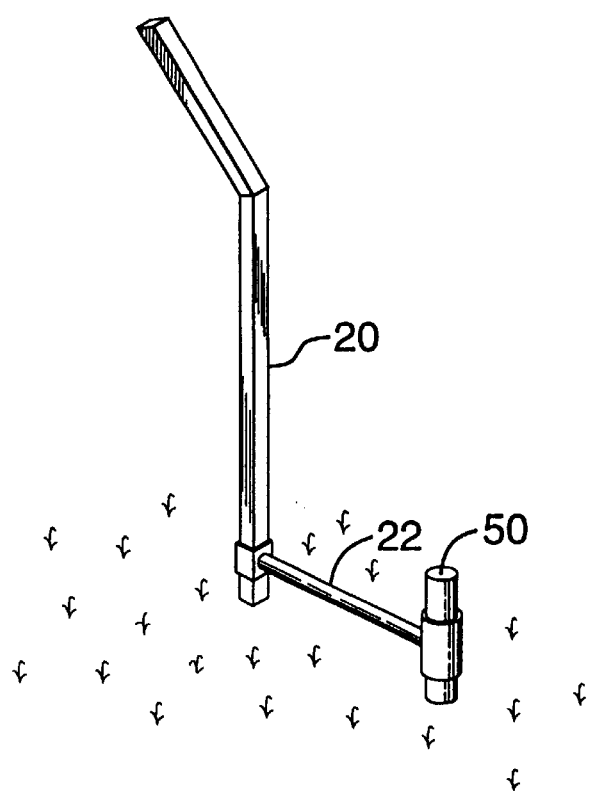
FIG. 5 is a perspective view of a portion of the present invention showing an alternate mounting configuration.
Figure 6:
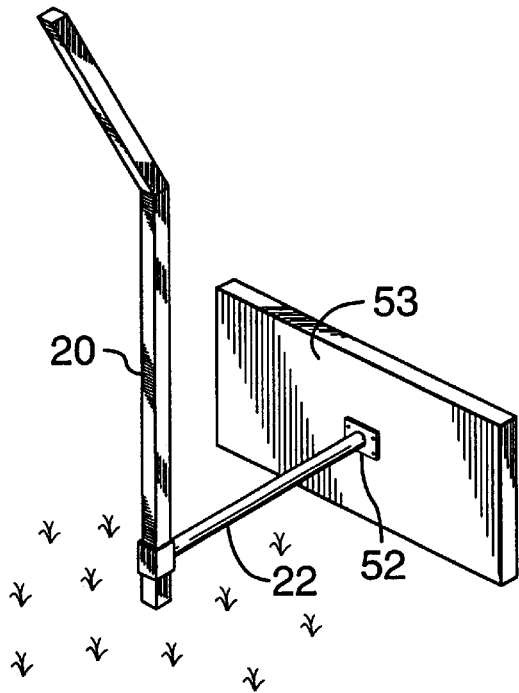
FIG. 6 is a perspective view of a portion of the present invention showing another alternate mounting configuration.

If attaching poles 20 to fence 12 is not practicable, or if no fence 12 is available, then poles 20 may be mounted directly to the ground by concrete backfilling or the like. Alternatively, as best seen in FIG. 5, poles 20 may be secured directly to anchored member 50 via mounting arms 22. Anchored member 50 may comprise either short stakes driven into the ground or some other existing structure. As seen in FIG. 6, poles 20 may even be mounted to a wall 53 by mounting arms 22 and attachment bracket 52.

Figure 7:
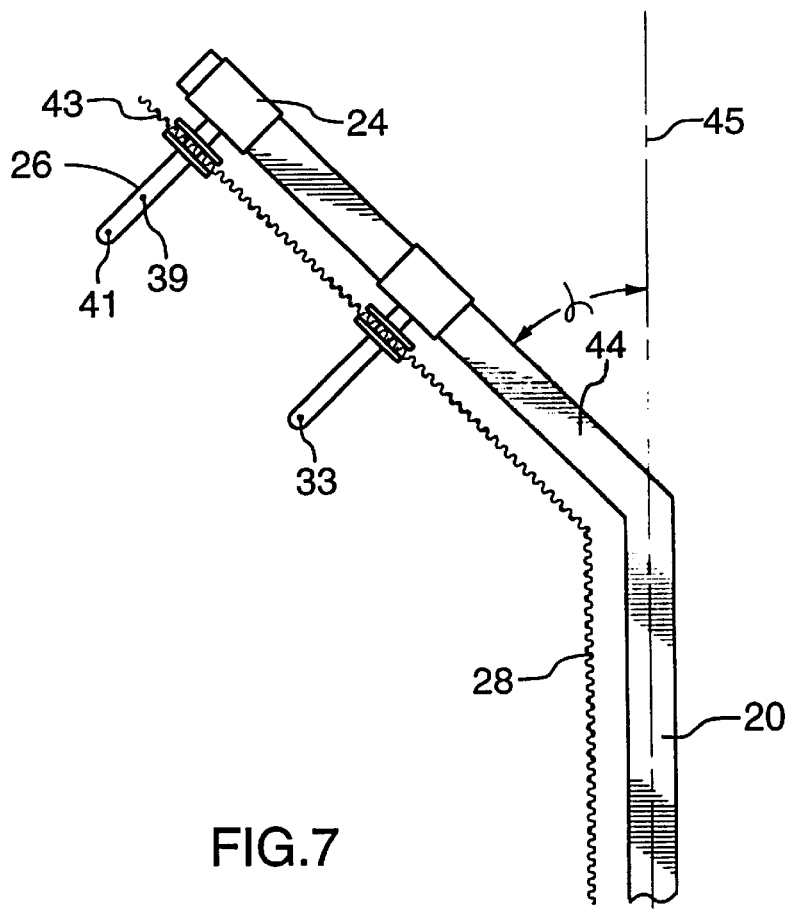
FIG. 7 is a side view of a top portion of the present invention.

Referring now to FIG. 7, poles 20 are provided with top portions 44 which are at an acute angle a from the main axis 45 of poles 20. The angle at which top portion 44 extends from the rest of pole 20 is selected to ensure that any animal climbing electric fence 18 will have to hang from the top of the fence substantially upside down. Angle α should be less than 90°. Preferably, top portions 44 are at a 60° angle from the rest of pole 20 and preferably at a 60° angle from the vertical. Top portion 44 may be either integral with the rest of pole 20 or, alternatively, the top portion may comprise an angled member which is mountable to the end of the pole.

Figure 3:
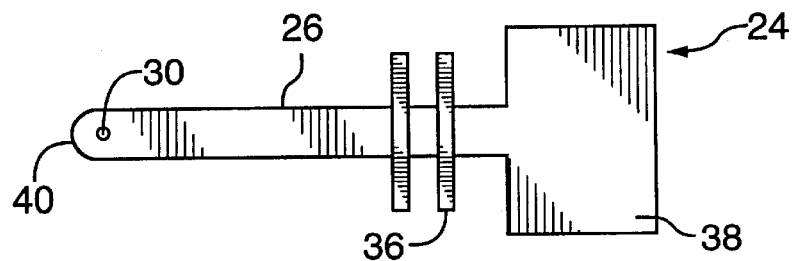
FIG. 3 is a side view of an insulated support member of the present invention.
Figure 4:
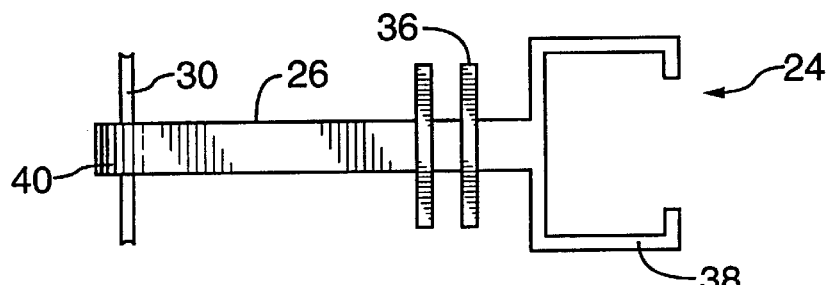
FIG. 4 is a top view of an insulated support member of the present invention.

Screen 28 may be mounted to poles 20 via a variety of methods known in the art. Preferably, screen 28 is mounted to poles 20 by mounting brackets 24. Mounting brackets 24 are preferably provided with fingers 26 which mount electric wires 30 to poles 20. As best seen in FIGS. 3 and 4, mounting brackets 24 comprise an elongated member having a first section 38 adapted to mount to poles 20 and a projecting finger 26 configured to protrude away from first section 38. Finger 26 further comprises a screen retaining portion 36, adapted to retain screen 28 and a wire retaining portion 40, adapted to hold electric wire 30. Mounting bracket 24 is made from an electrically non-conductive material such as plastic.

Finger 26 is sufficiently long to ensure that electric wire 30 will be positioned a few inches from screen 28 when electric fence 18 is assembled. The distance separating wire 30 from screen 28 is important. If the distance is too small, then the chances of accidental shorting of wire 30 and screen 28 is high; however, if the distance is too great, then it is less likely that an animal climbing screen 28 will contact both the screen and the wire simultaneously. Preferably, the distance separating wire 30 and screen 28, and thus the length of finger 26, is selected to be between 1.5 to six (6) inches. It has been discovered that most small animals, including squirrels, are unlikely to pass through a gap within the range of 1.5 to six inches without contacting both screen 28 and wire 30 simultaneously. Wires 30 are attached to end 40 of fingers 26 of brackets 24. It is also possible to mount wires 30 directly to screen 28 by a non-conductive member having one portion adapted to mount to the screen and another portion adapted to hold the wire.

Referring back to FIG. 2, screen 28 is made of electrically conductive material, such as galvanized steel. The screen size is sufficiently small to prevent small animals such as squirrels from passing through the screen. A portion of screen 28 may be buried into the ground a few inches to prevent small animals such as raccoons or rabbits from passing beneath the screen. Screen 28 is electrically grounded back to the electric fence energizer (not shown). Screen 28 is tensioned or stretched when it is attached to poles 20 to ensure that the screen does not sag or accidentally makes contact with electrified wires 30. It has been discovered that 1"XI," 16 gauge galvanized after welded (GAW) wire mesh makes a very effective screen against animals such as squirrels.

Electric wires 30 comprise wires made from an electrically conductive material such as copper, aluminum or galvanized steel. Wires 30 are tensioned to ensure that wires 30 do not accidentally touch screen 28. In operation, electric wires 30 are electrified by the application of a high voltage electric charge. Suitable electric charge generators, or energizers as they are commonly referred to, are available in the marketplace. Since screen 28 is electrically grounded, any animal touching both the screen and an electric wire 30 at the same time, shall receive an electric shock.

At least one electric wire 30 is attached to electric fence 18. Preferably, at least three separate electric wires 30 should be attached to poles 20. A lower electric wire 31 extending parallel to electric fence 18 a few inches above the ground, an upper electric wire 33, positioned on top portions 44 of poles 20, and another electric wire 30, positioned mid-way and parallel to wires 31 and 33. Lower electric wire 31 is positioned approximately two to three inches above the ground and four to six inches from screen 28; permitting the wire to make electric contact with a small animal attempting to burrow under electric fence 18. Upper electric wire 33, is positioned towards the end of top portion 44, opposite the enclosed area, such that any small animal attempting to climb over the electric fence shall make contact with the electrified wire. Other electric wires 30 may be mounted to poles 20 more or less mid-way between electric wires 31 and 33 to maximize the probability that a small animal attempting to climb electric fence 18 shall contact the wires.

It has been discovered that two or more electrified wires positioned on top portion 44 shall ensure that no small animal can climb over electric fence 18 without receiving an electric shock. Referring to FIG. 7, in addition to wire 33, two additional wires 39 and 41 are attached to top portion 44. Preferably wire 39 is positioned approximately 1.5 to 2.5 inches from screen 28 while wire 41 is positioned approximately three (3) to four (4) inches from screen 28. Both wires 41 and 39 are further positioned about four (4) to five (5) inches from top edge 43 of screen 28. Wire 33 is positioned about twelve (12) inches or so from top edge 43 of screen 28 and about three (3) to six (6) inches away from the screen. This combination of three electrified wires makes it nearly impossible for a squirrel or other animal to climb over screen 28 without touching one or more electrified wires.

To construct the electric fence, mounting arms 22 are first connected to poles 14 of chain link fence 12. Brackets 35 may be used to rigidly mount arms 22 to poles 14. Alternatively, arms 22 may be welded or brazed directly onto poles 14. Once arms 22 are secured to poles 14, poles 20 are then rigidly attached to arms 22 via brackets 34. Poles 20 are oriented such that upper portion 44 faces towards chain link fence 12. Since poles 20 are supported by arms 22, poles 20 do not have to be anchored to the ground, thereby reducing the time and effort required to install electric fence 18. Brackets 24 are then attached to poles 20 such that fingers 26 of brackets 24 point towards chain link fence 12. Screen 28 is then attached to poles 20 by mounting the screen to brackets 24. After screen 28 is properly installed and tensioned such that it is free of sags, electric wires 30 are attached to fingers 25 of brackets 24. Electric wires 30 are then tensioned to ensure that they do not sag or touch any portion of screen 28. After the entire perimeter fence is installed, electric wires 30 may be electrified.

In operation, any small animal, such as a squirrel, trying to gain entry past the electric fence will first have to scale chain link fence 12. Since electric fence 18 is more than five feet from chain link fence 12, the small animal will attempt to climb over the electric fence rather than jump over it. Since screen 28 is grounded and since electric wires 30 are electrically charged, the chances of the squirrel or other small animal climbing over electric fence 18 is minimal. Top portion 44 of poles 20, being at an angle to the vertical, will force any small climbing animal to climb substantially upside down, thereby increasing the chances of contacting electric wire 33. It has been observed that as soon as a squirrel or other small animal contacts an electrified wire while being grounded, the small animal falls from the electric fence and vacates the general area.

The invention having been so described, certain modifications and adaptations will be obvious to those skilled in the art. The invention includes all such modifications and adaptations which follow in the scope of the appended claims.

What is claimed is:

1. A fence for keeping selected small animals out of an enclosed area, comprising:
    a perimeter fence; and
    an internal fence extending parallel to the perimeter fence, spaced from the perimeter fence by a selected distance that is greater than about 5 feet the internal fence comprising:
        a screen comprising an upper inclined portion that is positioned at a selected angle to the vertical inclined toward the perimeter fence, and
        an electrically conductive element carrying an electric charge mounted adjacent the screen.

2. A fence as defined in claim 1 wherein the electrically conductive element comprises a plurality of electrically conductive elements and the internal fence further comprises a series of support members for supporting the electrically conductive elements, said support members being mounted to the perimeter fence by a plurality of mounting arms.

3. A fence as defined in claim 2 wherein the mounting arms comprise elongated members having a length greater than about 5 feet.

4. A fence as defined in claim 3 wherein the screen is electrically conductive and electrically grounded, the electrically conductive element positioned adjacent to the electrically conductive screen without making electrical contact thereto.

5. A fence as defined in claim 1 wherein the screen comprises a wire screen and the electrically conductive element comprises a metal wire, the metal wire being mounted on the side of the screen facing the perimeter fence.

6. A fence as defined in claim 5 wherein the wire comprises a plurality of wires that are mounted to the screen by mounting elements, the mounting elements having a projecting finger for holding the wire, the finger dimensioned to position the wire between 1.5 to 6 inches from the screen.

7. A fence as defined in claim 1 wherein the screen has a bottom portion mounted in a substantially vertical orientation and disposed below the inclined portion mounted away from the enclosed area at an angle from the vertical, wherein the angle is selected to cause animals climbing the screen to hang from the screen when the animal is climbing the inclined portion at least one of the wires being mounted adjacent the inclined portion of the screen.

8. A fence as defined in claim 6 wherein two of the wires are mounted to the fence screen adjacent, one of said two wires being positioned closer to the screen than the other wires.

9. A fence as defined in claim 8 wherein the support members comprise elongated poles and the mounting elements are adapted to attach to the poles.

10. A fence for keeping selected small animals out of an enclosed area, the fence comprising:
    a perimeter fence;
    an electrically conductive screen that is electrically grounded;
    a plurality of support members for supporting the screen;
    at least one electrically conductive wire positioned adjacent to the screen on a side of the screen facing the perimeter fence, the wire being mounted to the screen by a plurality of mounting elements, the wire being electrically connected to an electric charge generator; and p1 an elongated arm having first and second ends attached in supportive association to support the support members and the perimeter fence, the arm having a length of greater than about 5 feet between the first and second ends.

11. A fence as defined in claim 1 wherein the selected angle is less than 90° from the vertical.

12. A fence as defined in claim 11 wherein the electrically conductive wire is mounted to the electric fence at a position of between 1.5 inches to 6 inches from the screen.

13. A fence as defined in claim 12 wherein the wire comprises at least two adjacent wires that are mounted to the electric fence adjacent to the portion of the screen, one of said wires being positioned closer to the screen than the other.

14. A fence as defined in claim 10 wherein the support members comprise elongated poles, the poles being supported by an elongated arm having a first end attached to the pole and a second end attached to an object adapted to be rigidly secured to the ground.

15. A fence as defined in claim 11 further comprising a plurality of supporting elements attaching the wire to the screen, each supporting element having a first portion adapted to mount to the screen and a second projecting portion adapted to hold the wire, the projecting portion dimensioned to position the wire adjacent to the screen and between 1.5 to 6 inches from the surface of the screen.

16. A fence as defined in claim 12 wherein the screen has a top portion and a bottom portion, the bottom portion supported in a substantially vertical orientation and the top portion of the screen angled away from the enclosed area.

17. A fence as defined in claim 16 wherein the at least two adjacent wires are mounted adjacent the top portion of the screen, one of said two wires being positioned closer to the screen than the other wires.

18. A fence as defined in claim 16 wherein:

the support members comprise elongated poles; and and the perimeter fence is rigidly secured to the ground.

19. A fence as defined in claim 11 wherein the support members comprise elongated poles, the portion of the screen angled away from the enclosed area is supported by a plurality of angular members, the angular members being mounted to the elongated poles, the angular members extending from the elongated poles at the selected angle.

20. A fence as defined in claim 2, wherein the mounting arms have a length that is greater than about 5 feet.

21. A fence as defined in claim 11 wherein the selected angle is less than around 60° from the vertical.

22. A fence for keeping selected small animals out of an enclosed area, comprising:

a perimeter fence;

an internal fence extending parallel to the perimeter fence and spaced from the perimeter fence by a selected distance greater than about 5 feet, the internal fence comprising:

an electrically conductive screen, and an electrically conductive element carrying an electric charge mounted adjacent the screen; and elongated arms mounting the internal fence and the perimeter fence at the selected distance.

* * * * *